United States Patent [19]
Matsumoto

[11] Patent Number: 5,862,415
[45] Date of Patent: Jan. 19, 1999

[54] AUTO-FOCUSING CAMERA WITH PANNING STATE DETECTION FUNCTION

[75] Inventor: Yukihiro Matsumoto, Kawaguchi, Japan

[73] Assignee: Canon Kabushiki Kaisha, Tokyo, Japan

[21] Appl. No.: 503,633

[22] Filed: Jul. 18, 1995

[30] Foreign Application Priority Data

Jul. 19, 1994 [JP] Japan .................................. 6-187946

[51] Int. Cl.$^6$ ............................ G03B 7/08; G03B 13/36
[52] U.S. Cl. ............................................. 396/55; 396/95
[58] Field of Search ................. 354/400–408; 396/55, 95

[56] References Cited

U.S. PATENT DOCUMENTS

| | | | |
|---|---|---|---|
| 5,146,559 | 9/1992 | Uenaka | 354/402 |
| 5,379,088 | 1/1995 | Ueda et al. | 354/402 |
| 5,420,661 | 5/1995 | Hamada et al. | 354/402 |
| 5,448,051 | 9/1995 | Yamano | 250/201.2 |
| 5,475,566 | 12/1995 | Iwasaki et al. | 354/432 |
| 5,521,672 | 5/1996 | Nakamura et al. | 354/402 |

*Primary Examiner*—Russell Adams
*Assistant Examiner*—Michael Dalakis
*Attorney, Agent, or Firm*—Fitzpatrick, Cella, Harper & Scinto

[57] ABSTRACT

A camera includes (i) a detection circuit for detecting a relative moving state or a vibrating state between the camera and an object and (ii) a focusing adjustment apparatus for focusing on the object. The focusing adjustment apparatus is capable of performing a focusing operation in different focusing areas and locking the focusing area to a predetermined focusing area based on a result of a detection by the detection circuit.

15 Claims, 4 Drawing Sheets

AUTO-FOCUSING CAMERA WITH PANNING STATE DETECTION FUNCTION

BACKGROUND OF THE INVENTION

1. Field of the Invention

The present invention relates to an improvement in a camera comprising vibration detection means for detecting, e.g., a movement of a camera.

2. Related Background Art

Conventionally, a camera, which comprises a vibration prevention mechanism utilizing an acceleration sensor, a vibration gyro, or the like, is known. In this camera, the movement (vibration) of the camera is detected on the basis of the output from the sensor, and the optical system of the camera is corrected in correspondence with the sensor output.

However, in this prior art, even when the movement of the camera is detected by the sensor, the detected information is utilized in only correction of the optical system of the camera, and is not fed back to an auto-focusing device. For example, when a moving object to be photographed is tracked while executing a focus detection operation, the following problems are posed.

1) When the camera is being moved (panned or tilted) while executing a focus detection operation to photograph a moving object, if the auto-focusing device is set in the one-shot mode which stops the focus detection operation once an in-focus state of the object is attained, it is very inconvenient since the auto-focusing device must be reset and a focus detection operation must be performed again to track the moving object again.

2) In a camera which has an auto-focusing device comprising a plurality of auto-focusing sensors (to be referred to as AF sensors hereinafter), when the camera is being moved while executing a focus detection operation to photograph a moving object, each of the plurality of AF sensors performs focus detection, and thereafter, an area where the moving object as a principal object is present is selected to calculate final focus information. However, such processing requires much calculation time, and it is difficult to attain an in-focus state of the object when a fast moving object is tracked.

3) In a camera having an auto-focus device which comprises only one AF sensor but can artificially arbitrarily narrow or divide the sensor area, when the camera is being moved while executing a focus detection operation to photograph a moving object, if the use area of the AF sensor is not fixed, a calculation for selecting an area of the AF sensor (selection of an area where the moving object as a principal object is present) requires much time, and it is difficult to attain an in-focus state of the moving object.

SUMMARY OF THE INVENTION

Another aspect of the present invention is to provide a camera which can perform a photographing operation with a focusing adjustment operation suitable for photographing a moving object without requiring cumbersome operations of a user.

Another aspect of the present invention is to provide a camera which can shorten the time required for the focusing adjustment operation and can reliably attain an in-focus state of a faster moving object.

Another aspect of the present invention is to provide a camera which comprises AF mode selection means for selecting a servo AF mode independently of a currently selected AF mode when vibration detection means detects that the camera is being moved at a predetermined speed or higher in a given direction, and automatically switches the AF mode to the servo AF mode when the camera, for example, is being panned.

Another aspect of the present invention is to provide a camera which comprises sensor selection means for selecting a focus detection sensor at the center of an imaging field as a sensor to be used in a focusing adjustment operation when vibration detection means detects that the camera is being moved at a predetermined speed or higher in a given direction, and automatically selects the focus detection sensor at the center of the imaging field as the sensor used in the focusing adjustment operation when the camera, for example, is being panned.

Another aspect of the present invention is to provide a camera which comprises sensor area setting means for narrowing an area of a focus detection sensor used in a focusing adjustment operation to a position near the center of an imaging field when vibration detection means detects that the camera is being moved at a predetermined speed or higher in a given direction, and automatically sets the area near the center of the imaging field as the focus detection area when the camera, for example, is being panned.

Other objects of the present invention will become apparent from the description of the embodiments taken in conjunction with the accompanying drawings.

DESCRIPTION OF THE PREFERRED EMBODIMENTS

The present invention will be described in detail below with reference to the illustrated embodiments.

Figure 1:
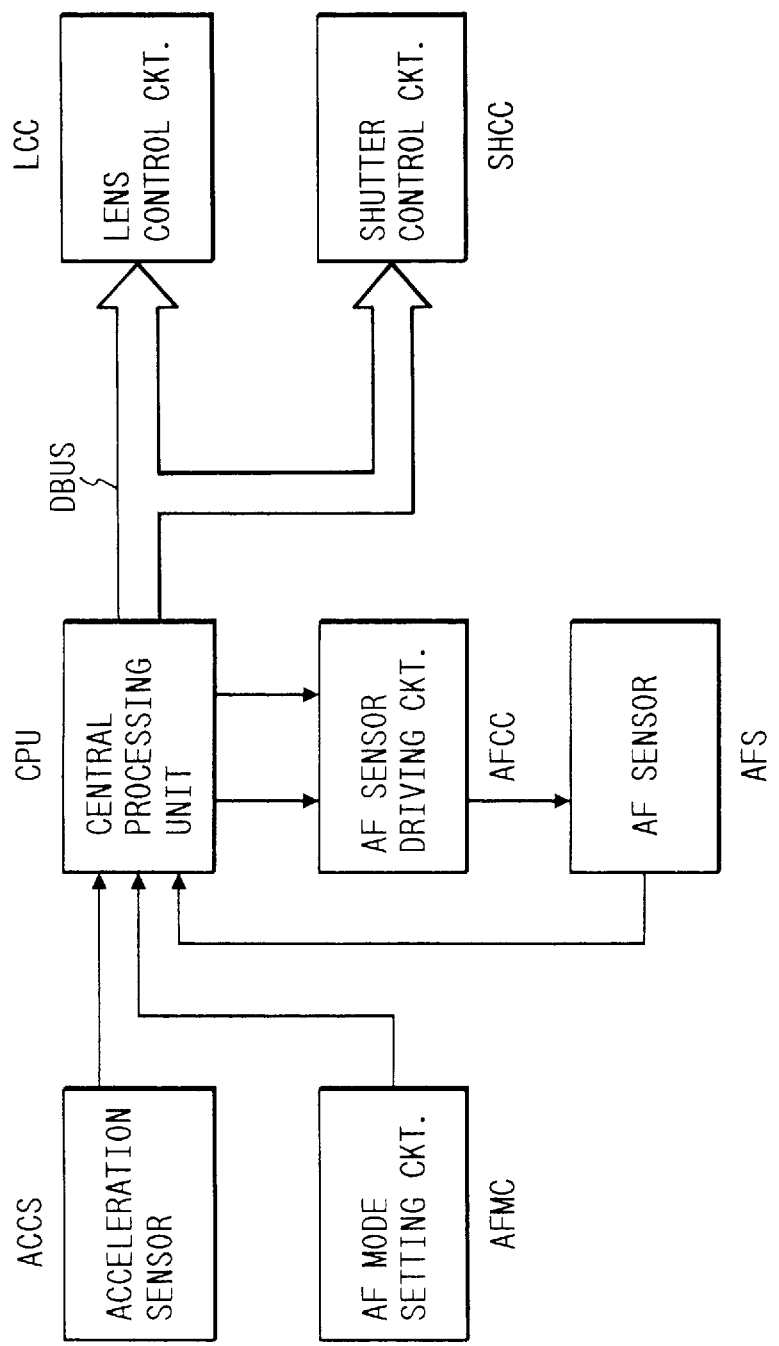
FIG. 1 is a schematic block diagram showing the arrangement of a camera according to the first embodiment of the present invention.

FIG. 1 is a schematic block diagram showing the arrangement of a camera according to the first embodiment of the present invention.

A central processing unit CPU comprises a one-chip microcomputer including a RAM, ROM, and ADC (analog-to-digital converter) (not shown). A data bus DBUS is used for exchanging data between the central processing unit CPU and the respective control circuits. A lens control circuit LCC controls the position of a correction lens (not shown) via a correction lens driving circuit (not shown) in accordance with a signal from the central processing unit CPU. A shutter control circuit SHCC controls the opening/closing operation of a shutter (not shown) via a shutter driving circuit (not shown) in accordance with a signal from the central processing unit CPU. An acceleration sensor ACCS detects a vibration acting on the camera and the movement of the camera. The signal output from the sensor ACCS is used in vibration prevention control, and is also used in switching of an AF mode and selection of an AF area. An AF sensor driving circuit AFCC drives an AF sensor AFS. An AF mode setting circuit AFMC sets an AF mode such as the one-shot AF mode, the servo AF mode, and the like.

A signal output from the acceleration sensor ACCS is input to the central processing unit CPU, and is converted from an analog signal into a digital signal by the internal ADC of the unit CPU. Thereafter, the digital signal is used in calculations for calculating the moving speed and acceleration of the camera and their directions. The calculation results are input to the lens control circuit LCC via the data bus DBUS, and the correction lens is driven via the correction lens driving circuit (not shown) in correspondence with the moving amount or the moving speed of the camera at that time.

When the central processing unit CPU detects, based on the calculation results, that the camera is being moved at a constant speed in a given direction, it switches the focus detection calculation.

Figure 2:
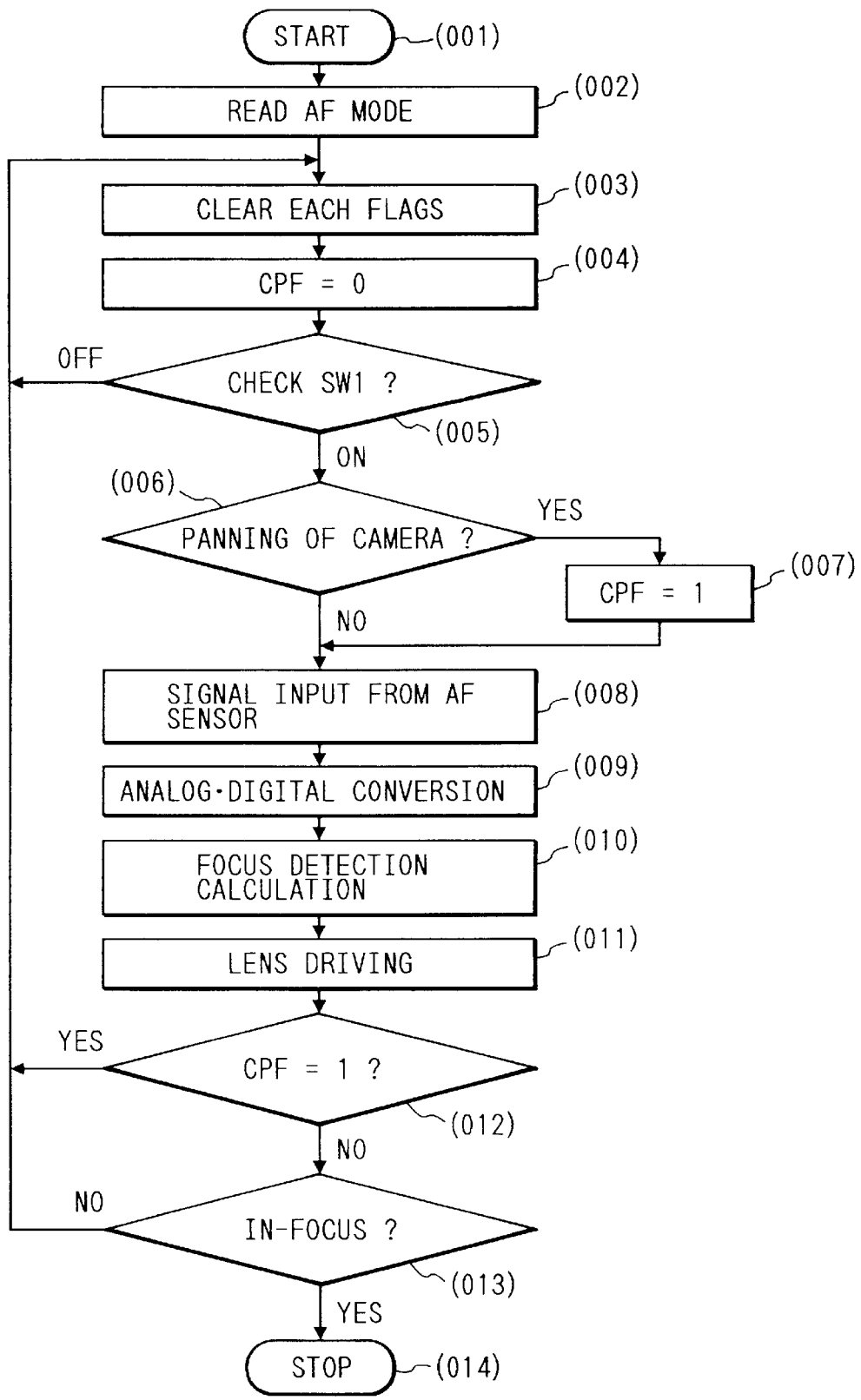
FIG. 2 is a flow chart showing the operation of a principal part of the camera according to the first embodiment of the present invention.

The operation upon switching of the focus detection calculation will be described below with reference to the flow chart in FIG. 2.

In step (002) after step (001), the state of the externally selected AF mode is read, i.e., whether the current AF mode is the one-shot AF mode which stops the focusing adjustment operation once an in-focus state is attained or the servo AF mode which repeats the focusing adjustment operation even after an in-focus state until a release button is depressed is read, and the read AF mode is set as the AF mode.

In step (003), the respective flags are initialized. In step (004), a flag CPF (camera panning flag) is cleared. In step (005), the state of a switch SW1 which is turned on at the half stroke position of the release button of the camera is checked. As a result, if the switch SW1 is ON, it is determined that a focus detection operation is started, and the flow advances to step (006); if the switch SW1 is OFF, since the focus detection operation is not started yet, the flow returns to step (003) and the control waits until the switch SW1 is turned on.

In step (006), it is checked, based on the above-mentioned calculation results, if the camera is being moved at a given speed in a given direction (to be referred to as a panning state hereinafter). If the camera is in the panning state, the flow advances to step (007), and the flag CPF is set to be "1". Thereafter, the flow advances to step (008). On the other hand, if the camera is not in the panning state, the flow directly jumps from step (006) to step (008). In step (008), the control waits for the input of a signal from the AF sensor AFS.

If the signal from the AF sensor AFS is input to the central processing unit CPU in step (008), the flow advances to step (009), and the input signal is converted from an analog value into a digital value by the internal ADC of the unit CPU. In step (010), the focus detection calculation is performed using the signal converted into the digital value, and the flow then advances to step (011). In step (011), the lens is driven based on the focus detection calculation result. In step (012), the flag CPF is checked. If "CPF=1", since the camera is in the panning state, the AF mode is switched to the servo AF mode independently of the AF mode read in step (002), and the flow returns to step (003), thus repeating the series of operations. On the other hand, if "CPF=0", since it is determined that the camera is not panned, the AF mode is switched to the one-shot AF mode independently of the AF mode read in step (002), and the flow advances to step (013) to check if an in-focus state is attained. If an in-focus state is attained, the flow advances to step (014), and the series of operations end. However, if an in-focus state is not attained, the flow returns to step (003) to repeat the focus detection, and the above-mentioned operations are repeated.

According to the first embodiment, the AF mode is switched in correspondence with a signal from the vibration detection means such as the acceleration sensor arranged in the camera. For this reason, even when the current AF mode is the one-shot AF mode, a focus detection operation suitable for photographing a moving object can be performed without executing any operation for switching the AF mode to the servo AF mode.

Figure 3:
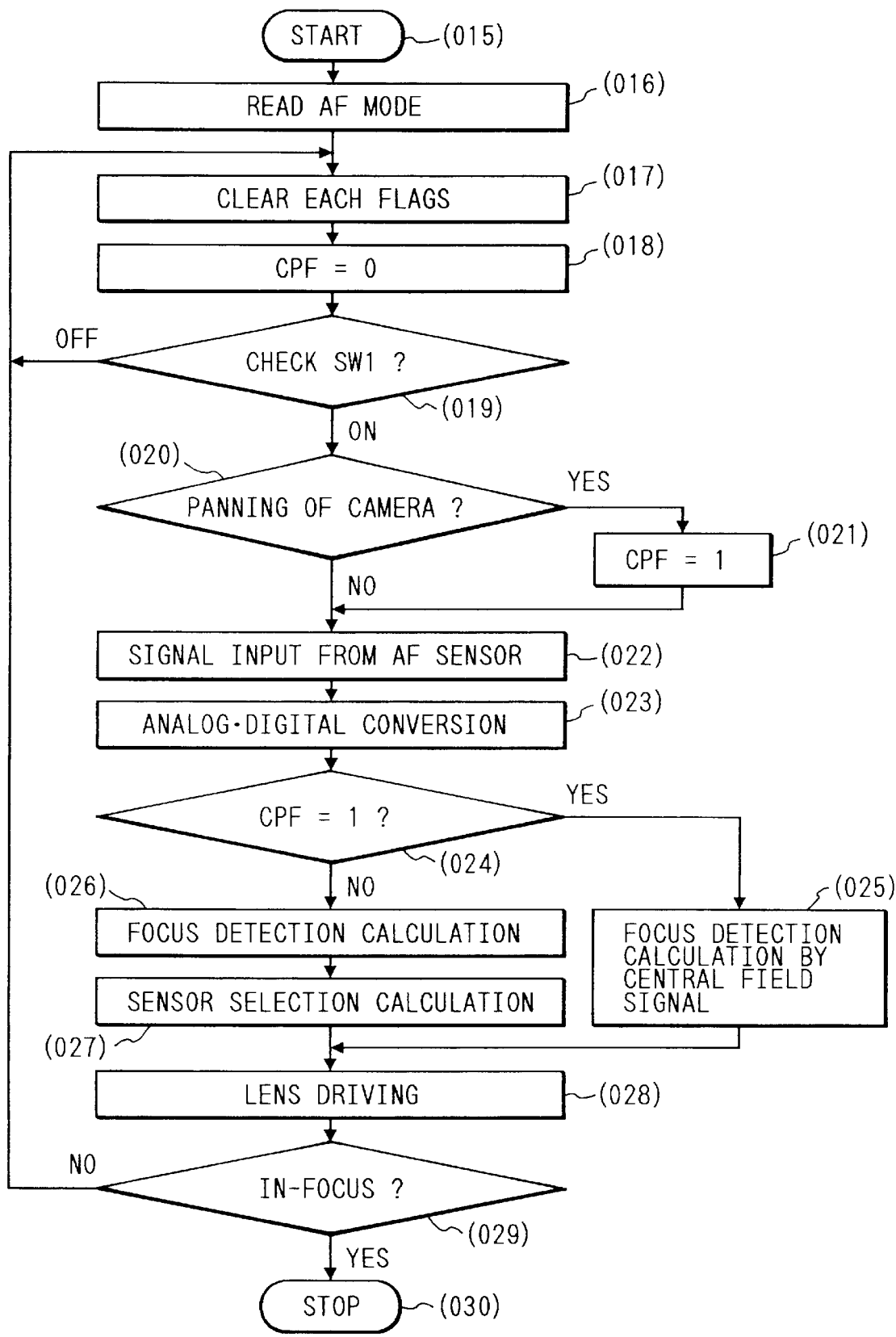
FIG. 3 is a flow chart showing the operation of a principal part of a camera according to the second embodiment of the present invention.

FIG. 3 is a flow chart showing the operation of a principal part (corresponding to the operation shown in FIG. 2) of a camera according to the second embodiment of the present invention. Note that the circuit arrangement of the camera is the same as that shown in FIG. 1, and a detailed description thereof will be omitted. In this embodiment, the AF sensor AFS arranged in this camera comprises a plurality of sensors including a central sensor. More specifically, the camera of this embodiment has a multi-focus detection function of detecting the focus states on different areas on the imaging field.

In step (016) after step (015), the state of the externally selected AF mode is read, i.e., whether the current AF mode is the one-shot AF mode which stops the focusing adjustment operation once an in-focus state is attained or the servo AF mode which repeats the focusing adjustment operation even after an in-focus state until a release button is depressed is read, and the read AF mode is set as the AF mode.

In step (017), the respective flags are initialized. In step (018), the flag CPF is cleared. In step (019), the state of the switch SW1 which is turned on at the half stroke position of the release button of the camera is checked. As a result, if the switch SW1 is ON, it is determined that a focus detection operation is started, and the flow advances to step (020); if the switch SW1 is OFF, since a focus detection operation is not started yet, the flow returns to step (017) and the control waits until the switch SW1 is turned on.

In step (020), it is checked if the camera is in the panning state, i.e., it is being moved at a given speed in a given direction, as in the above embodiment. If the camera is in the panning state, the flow advances to step (021), and the flag CPF is set to be "1". Thereafter, the flow advances to step (022). On the other hand, if the camera is not in the panning state, the flow directly jumps from step (020) to step (022). In step (022), the control waits for the input of a signal from the AF sensor AFS. In this case, since the camera has the multi-focus detection function, the control waits for the inputs of the sensor outputs from the AF sensors arranged in correspondence with the respective imaging field areas.

If the signals from the AF sensor AFS are input to the central processing unit CPU in step (022), the flow advances to step (023). In step (023), the input signals are converted from analog values into digital values by the internal ADC of the unit CPU, and the converted values are stored in the internal RAM. In this processing, data corresponding to the outputs from the AF sensors in units of areas are stored in the RAM. In step (024), the flag CPF is checked. If the flag CPF is set to be "1", the flow advances to step (025), and a focus detection calculation is performed by reading out the output signal from the central sensor from the RAM which stores the sensor signals. More specifically, focus detection is performed for only the central focus detection area of the multi-focus detection areas. The calculation result is utilized in lens driving processing in step (028).

On the other hand, if it is determined in step (024) that the flag CPF is not set to be "1", the flow advances to step (026), and focus detection calculations are performed for all the sensor signals (the sensor signals in units of areas) read out from the RAM. In step (027), a calculation for selecting one of the focus detection results calculated for the respective areas is performed on the basis of the focus detection calculation results of the respective sensors. For example, the closest focus detection result is selected from the focus detection results for the respective areas. The flow then advances to step (028).

In step (028), the lens is driven based on the focus detection calculation result specified in step (025) or (027). In step (029), it is checked if an in-focus state is attained. If an in-focus state is not attained, the flow returns to step (017) to repeat the series of operations. However, if an in-focus state is attained, the flow advances to step (030), thus ending the series of operations.

According to the second embodiment, when the position detection means such as the acceleration sensor arranged in the camera detects that the camera is panned, only the output from the central sensor of a plurality of AF sensors is used as a focusing adjustment signal. For this reason, the time required for focus detection can be shortened, and an in-focus state can be maintained for a faster moving object.

Figure 4:
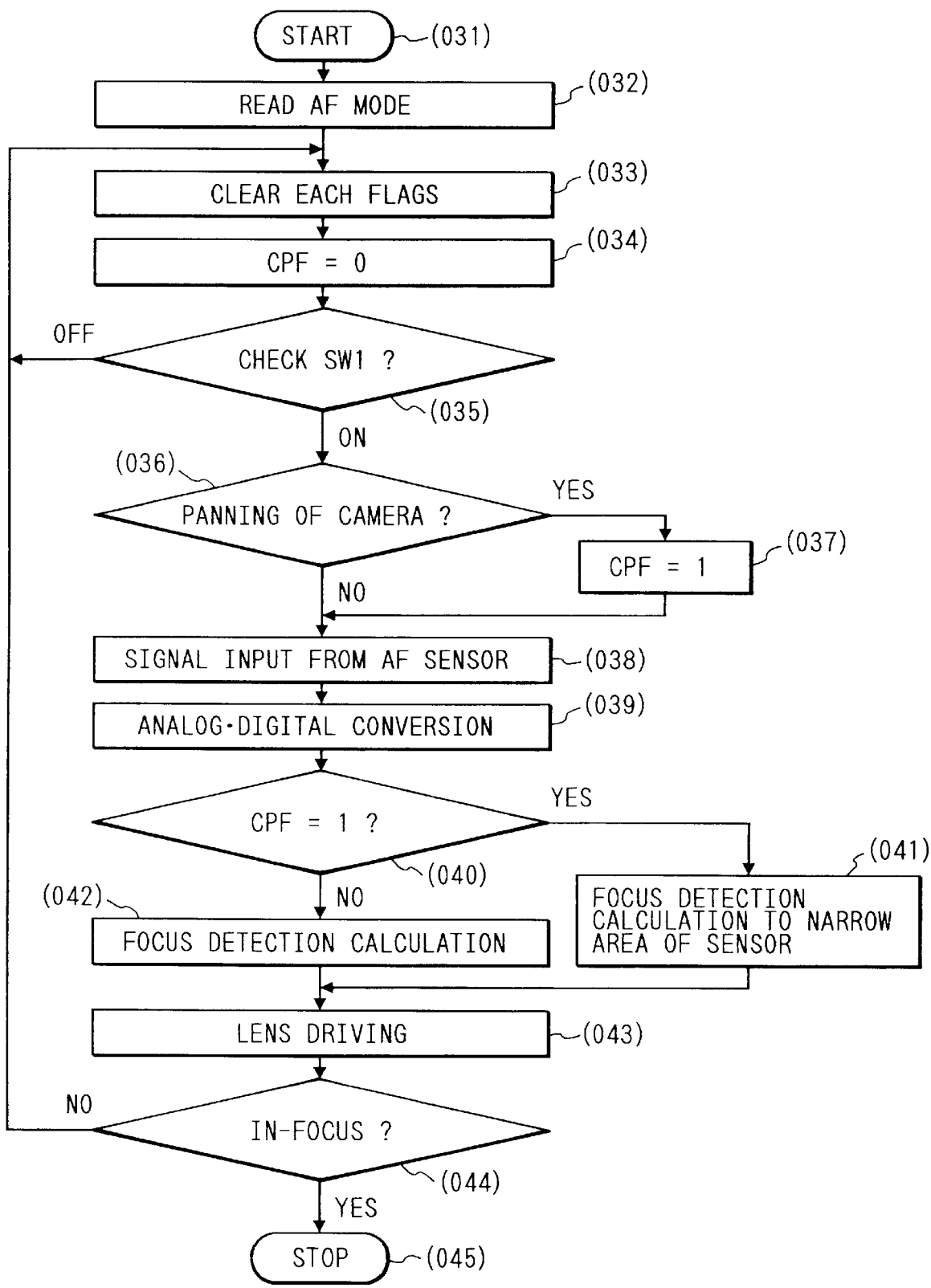
FIG. 4 is a flow chart showing the operation of a principal part of a camera according to the third embodiment of the present invention.

FIG. 4 is a flow chart showing the operation of principal part (corresponding to the operation shown in FIG. 2) of a camera according to the third embodiment of the present invention. Note that the circuit arrangement of the camera is the same as that shown in FIG. 1, and a detailed description thereof will be omitted.

Assume that the focus detection device arranged in this camera can artificially arbitrarily narrow the sensor area, used in calculation processing, of the output from the AF sensor AFS. More specifically, AF data obtained in units of areas are stored in a memory by scanning the single sensor as if the area on the AF sensor AFS were divided into a plurality of areas to obtain focus information, and AF data to be used corresponding to a required area is read out from the memory, thus artificially realizing multi-divided areas.

In step (032) after step (031), the state of the externally selected AF mode is read, i.e., whether the current AF mode is the one-shot AF mode which stops the focusing adjustment operation once an in-focus state is attained or the servo AF mode which repeats the focusing adjustment operation even after an in-focus state until a release button is depressed is read, and the read AF mode is set as the AF mode.

In step (033), the respective flags are initialized. In step (034), the flag CPF is cleared. In step (035), the state of the switch SW1 which is turned on at the half stroke position of the release button of the camera is checked. As a result, if the switch SW1 is ON, it is determined that the focus detection operation is started, and the flow advances to step (036); if the switch SW1 is OFF, since the focus detection operation is not started yet, the flow returns to step (033) and the control waits until the switch SW1 is turned on.

In step (036), it is checked if the camera is in the panning state, i.e., it is being moved at a given speed in a given direction, as in the above embodiments. If the camera is in the panning state, the flow advances to step (037), and the flag CPF is set to be "1". Thereafter, the flow advances to step (038). On the other hand, if the camera is not in the panning state, the flow directly jumps from step (036) to step (038). In step (038), the control waits for the input of a signal from the AF sensor AFS.

If the signal from the AF sensor AFS is input to the central processing unit CPU in step (038), the flow advances to step (039). In step (039), the input signal is converted from an analog value into a digital value by the internal ADC of the unit CPU, and the converted value is stored in the internal RAM. In this case, as in a case wherein a plurality of AF sensors are arranged, a plurality of data (AF data corresponding to respective areas) are stored in units of predetermined areas in the imaging field. In step (040), the flag CPF is checked. If the flag CPF is set to be "1", the flow advances to step (041), and a focus detection calculation is performed using only an output signal from a predetermined area (an area near the center) read out from the RAM which stores the sensor signals. This calculation result is utilized in lens driving processing in step (043).

If it is determined in step (040) that the flag CPF is not set to be "1", the flow advances to step (042), and focus detection calculations are performed using the sensor signals of pre-set areas, e.g., all the areas, read out from the RAM. The flow advances to step (043).

In step (043), the lens is driven based on the focus detection calculation result. In step (044), it is checked if an in-focus state is attained. If an in-focus state is not attained, the flow returns to step (033) to repeat the series of operations. However, if an in-focus state is attained, the flow advances to step (045), thus ending the series of operations.

According to the third embodiment, when the position detection means such as the acceleration sensor arranged in the camera detects that the camera is panned, a sensor area used in focus detection is narrowed to a central area, and focus detection is performed using only a signal obtained from the central area. For this reason, the time required for focus detection can be shortened, and an in-focus state can be maintained for a faster moving object.

In each of the above embodiments, the vibration detection means comprises an acceleration sensor. However, the present invention is not limited to this. For example, any other means such as an angular acceleration sensor, an angular velocity sensor, a velocity sensor, an angular displacement sensor, a displacement sensor, a method of detecting an image vibration itself, and the like may be adopted as long as they can detect a vibration.

In each of the above embodiments, a camera with a vibration prevention function has been exemplified. However, the camera need not always comprise this function, and the effect of the present invention can be obtained as long as the camera has vibration detection means such as an acceleration sensor.

In the above description, the present invention is applied to a camera such as a single-lens reflex camera, a lens-shutter camera, a video camera, and the like. However, the present invention can be applied to other optical equipment or other apparatuses, or a unit constituting a given apparatus.

Furthermore, according to the present invention, the above-mentioned embodiments or their techniques may be appropriately combined.

What is claimed is:

1. A cameras comprising:
   (a) a detection circuit for detecting a relative moving state or a vibrating state between said camera and an object: and
   (b) a focusing adjustment apparatus for focusing on the object, said focusing adjustment apparatus being capable of performing the focusing operation in different focusing areas and locking the focusing area to a predetermined focusing area based on a result of a detection by said detection circuit.

2. A camera according to claim 1, wherein said predetermined area is a specifically selected area.

3. A camera comprising:

(a) a detection circuit for detecting a relative moving state or vibrating state between said camera and an object: and (b) a focusing adjustment apparatus for focusing on the object, said focusing adjustment apparatus selecting a focus detection area on the basis of a detection result detected by said detection circuit, wherein said focusing adjustment apparatus comprises a plurality of sensor units for respectively receiving light beams from objects on different areas of an imaging field, and selects a sensor unit from among said plurality of sensor units in accordance with the detection result detected by said detection circuit, and wherein the sensor unit comprises a sensor unit for receiving a light beam from a central area of the imaging field.

4. A camera comprising:

(a) a detection circuit for detecting a relative moving state or vibrating state between said camera and an object: and (b) a focusing adjustment apparatus for focusing on the object, said focusing adjustment apparatus selecting a focus detection area on the basis of a detection result detected by said detection circuit, wherein said focusing adjustment apparatus comprises a plurality of sensor units for respectively receiving light beams from objects on different areas of an imaging field, and selects a sensor unit from among said plurality of sensor units in accordance with the detection result detected by said detection circuit, wherein said focusing adjustment apparatus selects the sensor unit when said detection circuit detects that the moving or vibrating state becomes a first predetermined state, and wherein the sensor unit comprises a sensor unit for receiving a light beam from a central area of the imaging field.

5. A camera comprising:

(a) a detection circuit for detecting a relative moving state or vibrating state between said camera and an object: and (b) a focusing adjustment apparatus for focusing on the object, said focusing adjustment apparatus selecting a focus detection area on the basis of a detection result detected by said detection circuit, wherein said focusing adjustment apparatus can select between a first focus detection area and a second focus detection area which is different from the first focus detection area, and selects one of the first and second focus detection areas in accordance with the detection result detected by said detection circuit, and wherein the second focus detection area is narrower than the first focus detection area.

6. A camera according to claim 5, wherein said focusing adjustment apparatus selects the second focus detection area when said detection circuit detects that the moving or vibrating state becomes a predetermined state.

7. A camera comprising:

(a) a detection circuit for judging whether said camera is in a panning state; and (b) a focusing adjustment apparatus having (i) a one-shot mode in which focusing is inhibited once an in-focus state is attained and (ii) a servo mode in which an operation for focusing adjustment is repeated independently of an in-focus state or an out-of-focus state, said focusing adjustment apparatus operating in one of the modes based on a detection result of said detection circuit.

8. A camera according to claim 7, wherein said detection circuit judges that said camera is in the panning mode when said camera is moving continuously in a direction at a speed faster than a predetermined speed.

9. A camera according to claim 7, wherein said focusing adjustment apparatus operates in the servo mode when said detection circuit judges that said camera is in the panning state.

10. A camera according to claim 8, wherein said focusing adjustment apparatus operates in the servo mode when said detection circuit judges that said camera is in the panning state.

11. A camera comprising:

(a) a detection circuit for detecting whether said camera is in a panning state in which the camera moves at a predetermined speed; and (b) a focusing adjustment apparatus for focusing on an object, said focusing adjustment apparatus selecting a focus detection area on the basis of a detection result detected by said detection circuit.

12. A camera according to claim 11, wherein said focusing adjustment apparatus comprises a plurality of sensor units for respectively receiving light beams from objects on different areas of an imaging field, and selects a sensor unit from among said plurality of sensor units in accordance with the detection result detected by said detection circuit.

13. A camera according to claim 12, wherein the sensor unit comprises a sensor unit for receiving a light beam from a central area of the imaging field.

14. A camera according to claim 11, wherein said focusing adjustment apparatus can select from a first focus detection area and a second focus detection area which is different from the first focus detection area, and selects one of the first and second focus detection areas in accordance with the detection result detected by said detection circuit.

15. A camera according to claim 14, wherein the second focus detection area is narrower than the first focus detection area.

* * * * *

UNITED STATES PATENT AND TRADEMARK OFFICE
CERTIFICATE OF CORRECTION

PATENT NO. : 5,862,415

DATED : January 19, 1999

INVENTOR(S) : Yukihiro MATSUMOTO

It is certified that error appears in the above-identified patent and that said Letters Patent is hereby corrected as shown below:

ON THE COVER PAGE:

AT [56] References Cited - U.S. PATENT DOCUMENTS:

```
"5,107,293    4/92    Sekine, et al.    354/430" and
"4,545,665    10/85   Aihara            354/402"
```
should be inserted.

COLUMN 6:

Line 55, "cameras" should read --camera,--.
Line 57, "object:" should read --object;--.

COLUMN 7:

Line 3, "object:" should read --object;--.
Line 21, "object:" should read --object;--.
Line 43, "object:" should read --object;--.

Signed and Sealed this

Twenty-seventh Day of June, 2000

Attest:

Q. TODD DICKINSON

*Attesting Officer*    *Director of Patents and Trademarks*